United States Patent
Vitkov et al.

[15] 3,704,759
[45] Dec. 5, 1972

[54] ROAD WHEEL DRIVE ARRANGEMENT FOR AN ELECTRICALLY POWERED INDUSTRIAL VEHICLE

[72] Inventors: Emil Slavchev Vitkov; Milko Ivanov Petkov; Gueorgui Stoylov Atanassov, all of Sofia, Bulgaria

[73] Assignee: DSO "Balkancar", Sofia, Bulgaria

[22] Filed: Oct. 20, 1970

[21] Appl. No.: 82,464

[30] Foreign Application Priority Data

Oct. 21, 1969  Bulgaria..........................13218

[52] U.S. Cl. ....................180/65 F, 310/67, 310/118
[51] Int. Cl. .............................................B60k 7/00
[58] Field of Search.....180/65 F, 13, 10, 55; 310/67, 310/115, 118

[56] References Cited

UNITED STATES PATENTS

| 638,643 | 12/1899 | Newman et al. | 310/67 R |
| 1,323,245 | 12/1919 | Borkes | 310/67 R X |
| 1,577,304 | 3/1926 | Schurch | 310/67 R |

*Primary Examiner*—Philip Arnold
*Attorney*—Arthur O. Klein

[57] ABSTRACT

The outer rotor of a statorless electric drive motor and the drive wheel of an electric fork-lift truck or similar vehicle to be powered thereby are each directly connected to the outer motor case or housing. The housing is mounted for rotation with respect to the vehicle body. The central gear of a speed-reducing planetary gear set is affixed to the shaft of the inner rotor. The satellite or, alternatively, the annular ring gear of the set is directly connected to the rotatable motor housing, while the other of such annular or satellite gears is affixed to the body of the vehicle to immobilize such latter gear against rotation. Such an arrangement avoids the necessity of separate rotational connections among the inner and outer rotors and the drive wheel.

1 Claim, 1 Drawing Figure

PATENTED DEC 5 1972　　　　　　　　　　　　　　　　　　　　3,704,759
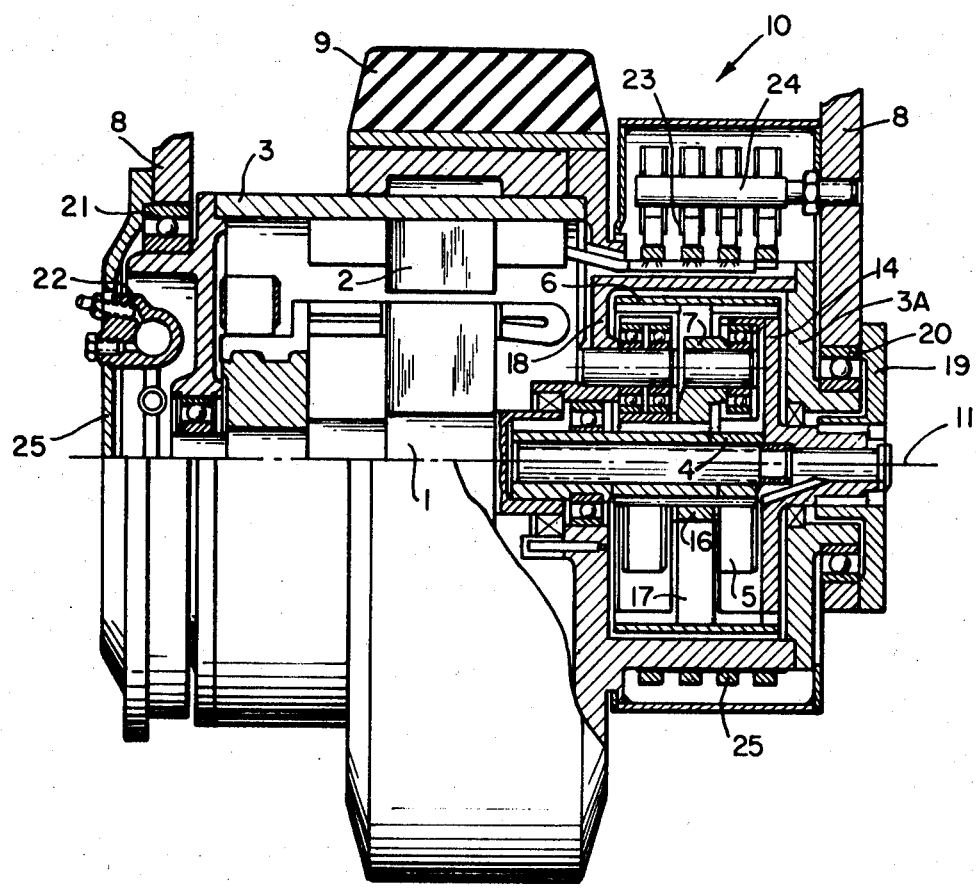
INVENTORS:
EMIL SLAVCHEV VITKOV
MILKO IVANOV PETKOV
GUEORGUI STOYLOV ATANASSOV
Arthur O. Klein
Attorney

ROAD WHEEL DRIVE ARRANGEMENT FOR AN ELECTRICALLY POWERED INDUSTRIAL VEHICLE

BACKGROUND OF THE INVENTION

In order to conserve space in the wheel drive of an electrically powered industrial vehicle, the driven road wheel may be powered by means of a conventional statorless electric motor having magnetically coupled inner and outer rotors. Such motor is generally less bulky than an ordinary direct current electric motor for the road speeds required.

The road wheel is generally mounted on the outer case or housing of the statorless motor, which housing is mounted for rotation with respect to the vehicle body. Ordinarily, the driving of the inner rotor in one direction at a first speed will, by the magnetically coupled relationship between the inner and outer rotors, normally effect rotation of the latter in the opposite direction at the same speed unless suitable constraints are present. Since the normal speed of the rotors is too high for ordinary road speeds of the vehicle drive wheel, such constraints are required. In presently known arrangements, such constraints generally take the form of a separate link between the rotors and the rotatable housing to which the wheel is affixed, whereby the housing exhibits relative motion with respect to the inner and outer rotors.

Such existing arrangements are disadvantageous in that (1) they require separate rotational connections and dynamic links among the inner and outer rotors and the wheel-carrying housing; (2) they aggravate the problem of motor cooling; (3) they impose extra loads on bearings and packings; and (4) they add undesirably to the inertial mass of the machine.

SUMMARY OF THE INVENTION

These disadvantages are overcome by the present invention in which separate rotational connections between the outer rotor and the housing are eliminated. Illustratively, the outer rotor and the road wheel are each fixedly mounted on the rotatable housing. A speed-reducing rotational coupling comprising at least one planetary gear set is coupled between the inner rotor, which is driven when electric power is applied to the motor, and the rotatable housing. The speed reduction ratio may be chosen so that rotation of the inner rotor at a prescribed speed causes rotation of the road wheel at the slower operating speed of the vehicle.

In one form of the invention the satellite gears of the speed-reducing set is immobilized against orbital motion, while the outer annular gear of the set is directly coupled to the rotatable housing. Alternatively, the annular gear may be immobilized to permit orbital motion of the satellite gears, and such orbital motion is then converted by a suitable link to rotational motion of the housing.

A third form of the invention employs two stages of speed reduction. The orbital motion of the satellite gears in the first stage, which engage an immobilized annular gear, is directly converted to rotational motion, about the motor axis, of the control gear of the second stage. The orbital motion of the satellite gears in the second stage, which are engaged with the second central gear and the immobilized annular gear, is directly transmitted to the outer housing to drive the road wheel.

BRIEF DESCRIPTION OF THE DRAWING

The nature of the invention and its advantages will appear more fully from the following detailed description taken in conjunction with the appended drawing, in which:

The single FIGURE of the drawing is an elevation view, partly broken away, of a statorless electric motor coupled to a road wheel of an electrically powered vehicle in accordance with the invention, and employing two stages of speed reduction gearing.

One practical embodiment of an arrangement in accordance with the invention is shown in the drawing. This arrangement employs two stages of speed-reducing planetary gearing.

As shown in the drawing, a statorless electric motor 10 is provided with an inner rotor 1 disposed along an axis 11, and an outer rotor 2 affixed to the inside wall of a motor housing 3. A road wheel 9 of the vehicle to be operated is affixed to the outer wall of the housing 3.

A central "gear" 4 (represented by an elongated toothed member) of the first stage of planetary gearing is affixed to a right end of the inner rotor 1. A plurality of first satellite gears 5—5 are disposed in opposite radial engagement with the gear 4 and with the internal periphery of an annular gear 6, represented by an internally toothed rim. The rim 6 is in turn affixed to a yoke 8 of the vehicle through a disk 14 and a cover plate 19, so that the annular gear 6 is constrained against rotation. As a result, orbital motion of the satellite gears 5 in engagement therewith is permitted.

Orbital motion of the gears 5 is converted, by a member 7 joining the axes of the gears 5, to rotational motion of a second central gear 16 mounted coaxial with the gear 4 and illustratively forming part of the member 7. The gear 16, in effect, is the central gear of the second speed-reducing stage.

A plurality of second satellite gears 17—17 are in opposite radial engagement with the second central gear 16 and the rim 6. A yoke 18 rigidly connects the axes of the satellite gears 17 to the housing 3. Such housing, in turn, is mounted for rotation with respect to the vehicle yoke 8 by means of a right bearing 20 (associated with an end plate 3A of the housing 3) and a left bearing 21. (A disk 22 of a motor brake 25 is fixedly mounted on the yoke 8 adjacent the left bearing 21). Hence, the yoke 18 effectively converts the orbital motion of the satellite gears 17 in the second set to a corresponding rotational motion of the drive wheel 9 affixed to the housing 3.

The required electric power for the motor 10 is brought in from the vehicle via the fixed yoke 8 to a set of commutator-brush holders 23-23 mounted on a common support 24. The support 24 is affixed to the yoke 8. The brushes contact corresponding metallic slip rings 25-25 disposed on an outer surface of the yoke 18 for supplying power to the rotor in a conventional manner.

In operation, when current is applied to the motor 10 via the brushes and slip rings, the resulting rotation of the rotor 1 is converted by the two stages of planetary gearing to the required slower speed of the wheel 9.

In the foregoing, the invention has been described in connection with illustrative embodiments thereof. However, since many other variations and modifications will now be obvious to those skilled in the art, it is accordingly desired that the breadth of the claims not be limited to the specific disclosure herein contained.

What is claimed is:

1. For use in an electrically powered industrial vehicle, an improved apparatus for transmitting motion from a statorless electric motor having inner and outer rotors to a vehicle road wheel affixed to an outer housing of the motor, which comprises means for affixing the outer rotor to the outer housing, means mounting the outer housing for rotation with respect to the vehicle body, a speed-reducing coupling interconnecting the inner rotor and the outer housing, whereby rotation of the inner rotor at a first speed causes the rotation of the road wheel at a second and slower speed, the speed-reducing coupling comprising in combination, a first central gear affixed to the shaft of the inner rotor, an annular gear surrounding and concentric with the first central gear, a first satellite gear in opposite radial engagement with the first central gear and the annular gear, means including a second central gear for directly converting orbital motion of the first satellite gear to rotational motion of the second central gear, a second satellite gear in opposite radial engagement with the second central gear and the annular gear, means for fixedly connecting the annular gear to the vehicle body, and means for converting orbital motion of the second satellite gear to rotational motion of the outer housing so that the road wheel rotates at the orbital speed of the second satellite gear when the inner rotor is driven.

* * * * *